United States Patent
Van Der Linden (10) Patent No.: US 9,936,287 B2
(45) Date of Patent: Apr. 3, 2018

(54) DEVICE FOR CREATING A SOUND SOURCE

(71) Applicant: Rsonance B.V., Best (NL)

(72) Inventor: Petrus Johannes Gerardus Van Der Linden, Diest (BE)

(73) Assignee: RSONANCE B.V., Best (NL)

( * ) Notice: Subject to any disclaimer, the term of this patent is extended or adjusted under 35 U.S.C. 154(b) by 0 days.

(21) Appl. No.: 15/036,141

(22) PCT Filed: Nov. 14, 2014

(86) PCT No.: PCT/IB2014/002455
§ 371 (c)(1),
(2) Date: May 12, 2016

(87) PCT Pub. No.: WO2015/071742
PCT Pub. Date: May 21, 2015

(65) Prior Publication Data
US 2016/0295317 A1    Oct. 6, 2016

(30) Foreign Application Priority Data
Nov. 15, 2013  (NL) ...................................... 1040501

(51) Int. Cl.
*H04R 5/02* (2006.01)
*H04R 1/26* (2006.01)
(Continued)

(52) U.S. Cl.
CPC ............... *H04R 1/323* (2013.01); *G01H 7/00* (2013.01); *G10K 9/13* (2013.01); *G10K 9/22* (2013.01); *H04R 29/001* (2013.01)

(58) Field of Classification Search
CPC .. H04R 2499/11; H04R 1/2834; H04R 1/403; H04R 1/323; H04R 1/345
(Continued)

(56) References Cited

U.S. PATENT DOCUMENTS

| 4,268,719 A | 5/1981 | Manger |
| 4,805,221 A | 2/1989 | Quaas |

(Continued)

FOREIGN PATENT DOCUMENTS

| GB | 375994 A | 7/1932 |
| WO | 94004008 A1 | 2/1991 |
| WO | 9116798 A1 | 10/1991 |

OTHER PUBLICATIONS

The International Search Report and Written Opinion from PCT Application No. PCT/IB2014/002455 dated Dec. 21, 2015.

*Primary Examiner* — George Monikang
(74) *Attorney, Agent, or Firm* — Troutman Sanders LLP; Ryan A. Schneider (57) ABSTRACT

Described is a device for creating a sound source comprising integrated measuring means (50) for measuring a property representative of the strength of the sound source, the device comprising a sound generator (40a, 40b) for generating sound within an annular space defined around a central axis, the device comprising a pair of guiding surfaces (113, 123) for guiding sound away from the annular space in opposite directions along the central axis. With sound being guided as described, sound in addition being allowed to propagate outside the device in a radial direction with respect to the central axis, a high degree of omnidirectionality of the created sound source is attained.

25 Claims, 8 Drawing Sheets

(51) Int. Cl.
*H04R 1/24* (2006.01)
*H04R 1/32* (2006.01)
*G10K 9/13* (2006.01)
*G10K 9/22* (2006.01)
*G01H 7/00* (2006.01)
*H04R 29/00* (2006.01)

(58) Field of Classification Search
USPC .................. 381/87, 332, 334–336, 160, 182, 381/334–336.16, 310
See application file for complete search history.

(56) References Cited

U.S. PATENT DOCUMENTS

| | | | |
|---|---|---|---|
| 4,878,561 A | 11/1989 | Tengstrand | |
| 6,229,899 B1* | 5/2001 | Norris | G10K 15/02 381/77 |
| 2005/0129258 A1 | 6/2005 | Fincham | |
| 2006/0094378 A1* | 5/2006 | Murray | H04M 1/03 455/128 |
| 2007/0081680 A1 | 4/2007 | Yen | |

\* cited by examiner

DEVICE FOR CREATING A SOUND SOURCE

CROSS-REFERENCE TO RELATED APPLICATIONS

This application is a US National Stage of International Application No. PCT/IB2014/002455, filed 14 Nov. 2014, which claims the benefit of NL 1040501, filed 15 Nov. 2013, both which are fully incorporated by reference.

FIELD OF THE INVENTION

The present invention relates to a device for creating a sound source, the device comprising integrated measuring means for measuring a property representative of the strength of the sound source, the device comprising a housing having a sound emission area comprising at least one emission opening for emitting a sound wave, and at least one sound generator for generating a sound wave, arranged in the housing so as for a generated sound wave to radiate from the sound emission area.

BACKGROUND OF THE INVENTION

It is known for the acoustics of a certain environment to be analysed using a measuring system comprising a multitude of spatially distributed loudspeakers, wherein a single microphone is positioned at a certain central location.

In an alternative setting, a measuring system for analysing the acoustics of an environment may comprise a multitude of spatially distributed microphones, wherein at a central location, a single loudspeaker is positioned.

Due to the reciprocal character of sound transmission, a sound source can be replaced by a microphone and a microphone by a sound source, with a performed measurement still providing the same information. Therefore, performing acoustics measurements with a single-loudspeaker system as described above is in principle able to provide the same information as performing such measurements with a single-microphone system.

In both types of measuring systems, it is important for the central device to behave as much as possible in an omnidirectional way, so that sound or a certain level is received by a microphone or emitted by a loudspeaker across the whole three-dimensional space surrounding the device.

Whereas for a microphone, omnidirectionality is relatively easily achievable by making it smaller, for a loudspeaker, the solution is less simple. This is related to the fact that a loudspeaker needs to have a certain size to provide sound of a sufficient level. Furthermore, a loudspeaker needs to have an certain interior space of certain size to be able to provide sound of a sufficiently low frequency.

For obtaining omnidirectionality in a loudspeaker, a standard solution is to provide it with a multitude of sound generators, wherein each sound generator is configured to emit sound in a different direction. With the multiple sound generators being arranged in a single housing, such a loudspeaker is provided with sufficient size and internal volume to generate sound of a sufficiently high level and sufficiently low frequency, while at the same time sound of sufficient level can be emitted towards to the whole of the surroundings of the device.

An example of a loudspeaker currently used in acoustic analyses, that to a relatively large extent behaves in an omnidirectional way, comprises a housing of a substantially dodecahedral shape, wherein a hole is provided in each of the walls of the housing lining a face of the dodecahedral shape, wherein a multitude of sound generators is provided, each sound generator lining one of the holes provided in the walls of the housing.

It has been found the degree of omnidirectionality of the dodecahedral loudspeaker decreases with frequency. For frequencies higher than a certain limit, a difference of several dB in sound level has been found to exist between various positions at a same radial distance away from the device, which is too large a difference to provide sufficiently accurate measurements. The dodecahedral loudspeaker furthermore has a relatively complex structure, and is relatively expensive.

Certain types of loudspeakers are known to be provided with a sensor for measuring a property representative of the strength of a sound source created by that loudspeaker. Such a sensor may for instance be configured to measure an air volume displacement or an air pressure difference generated by a sound generator of the loudspeaker in exciting a sound wave.

Loudspeakers provided with a sensor as described that are currently known are either small in size, providing a high degree of omnidirectionality, but only in combination with a low output level, or they are large in size, providing a high output level, but only in combination with a low degree of omnidirectionality. Loudspeakers as described are not known to provide a relatively high degree of omnidirectionality in combination with a high output level, or to provide a degree of omnidirectionality that is at least suitable for sufficiently accurate measurements using relatively high frequencies.

WO 96/11558 describes a device for creating an omnidirectional sound source comprising a loudspeaker which in one direction radiates into a hollow coupler with an open inlet communicating with and being closed by said loudspeaker as well as with an open outlet for sound to radiate from, said coupler comprising walls which are of a sectional area decreasing in a direction away from the loudspeaker, wherein the loudspeaker in the opposite direction radiates into a cabinet, wherein the sectional area of the cabinet decreases in a direction away from the loudspeaker. With this configuration, the outlet for sound to radiate from is of a substantially smaller diameter than the loudspeaker.

The company Bruel & Kjaer sells a device for creating an omnidirectional sound source comprising a loudspeaker radiating through a conical coupler to a circular orifice, wherein an adapter has been added at the output to measure the output volume velocity.

SUMMARY OF THE INVENTION

An object of the present invention is to provide a solution to the problems related to the lack of omnidirectionality of loudspeakers used in acoustic analyses. In particular, the present invention aims to provide a device for creating a sound source of measurable strength, providing a relatively high degree of omnidirectionality for a relatively wide range of frequencies and for relatively high sound levels.

The above is attained by a device wherein the housing has a longitudinal axis and a continuous circumference within a plane perpendicular to the longitudinal axis, the housing comprising a pair of housing portions located on opposite sides of the sound emission area, the housing portions each having a cylindrical outer surface extending away from the sound emission area along the longitudinal axis, the sound emission area extending along the continuous circumference.

With the sound emission area extending along the continuous circumference, a generated sound wave can radiate from the emission area along the full circumference of the housing, after which the sound wave is allowed to propagate further in the radial direction. With the housing comprising a pair of housing portions located on opposite sides of the sound emission area, the housing portions each having a cylindrical outer surface extending away from the sound emission area along the longitudinal axis of the housing, a radiated sound wave is further allowed to propagate along the outside of the housing in a direction perpendicular to the direction in which the sound wave radiated from the emission opening. As a result of the combined radial and longitudinal propagation, the device according to the invention enables a sound wave to develop substantially homogeneously into three dimensions, providing a high degree of omnidirectionality.

In a practical embodiment, the at least one emission opening comprises a ring-shaped continuous opening, or a ring-like arranged series or grid of discrete openings, extending along the continuous circumference.

Furthermore, in a practical embodiment, at least one of the housing portions comprises a tube portion, providing the housing with an increased internal volume.

The size of the sound emission area along the longitudinal axis of the housing may equal two times the average outer diameter of one of the outer surfaces, preferably 1.8 times or less, and more preferably one time or less. Smaller sizes of the area have been found to provide increased degrees of omnidirectionality, i.e., to provide smaller differences in sound level between various locations on the surface of a sphere of a certain radius defined around the device. Herein, the specific sizes mentioned provide specific improvements in accuracy.

At least one of the outer surfaces may have the same cross-sectional shape along a length of one time the average diameter, preferably two, three, four, six or ten times that diameter. Longer distances have been found to increasingly improve the degree of omnidirectionality obtained, each of the specific sizes mentioned providing specific improvements in accuracy.

For getting a symmetrical sound field, the two outer surfaces may have symmetrical positions and shapes with respect to the sound emission area.

For improved omnidirectionality, at least one of the outer surfaces may taper towards the longitudinal axis for an increasing distance away from the sound emission area.

Also for improved omnidirectionality, at least one of the housing portions may have an end part located away from the sound emission area, the end part having a tapered or rounded shape, a transition between said at least one of the housing portions and said end part preferably being smooth.

At least one of the outer surfaces may have a rotationally symmetric shape, preferably a round or polygonal shape.

A device according to the invention may comprise multiple sound generators each having a vibrational member lining one of multiple of emission openings, the multiple emission openings being distributed along the circumference of the sound emission area. In such an embodiment, a sound wave can be generated at the location of an emission opening by vibrational members vibrating in the radial direction of the housing, and a sound wave is allowed to propagate directly into the surroundings of the device without passing through the interior of the housing.

Alternatively, a device according to the invention may comprise a sound generator having a vibrational member lining the cross sectional opening of a housing portion formed as a tube portion. In such an embodiment, a sound wave is generated by a vibrational member vibrating in the longitudinal direction of such a tube portion, and a sound wave is passed along a short or long distance through the interior of the housing before being emitted by an emission opening. For sake of completeness it is noted that with a vibrational member lining a cross sectional opening of a tube portion, the vibrational member is meant to be positioned with a vibrating surface thereof oriented along a transverse cross section of the tube portion's interior space.

The sound generator may be positioned with its vibrational member located directly adjacent the sound emission area. Then, the distance traveled by a sound wave inside the housing is kept relatively short.

The sound generator may also be positioned with its vibrational member located at a certain distance away from the sound emission area. Then, the distance traveled by a sound wave inside the housing is relatively long.

A second sound generator may be arranged in the other housing portion, so as for a resulting sound wave formed from the individual sound waves generated by the first and second sound generators to be emitted from the sound emission area.

Alternatively, the other housing portion may be provided with a reflecting surface for reflecting a sound wave generated by the one sound generator, so as for a resulting sound wave formed from a sound wave generated by the one sound generator and the reflection thereof coming from the reflecting surface to be emitted from the sound emission area.

The measuring means may be arranged in the interior or on the exterior of the housing, for measuring a property measurable inside the housing or outside the housing, respectively.

The measuring means may be positioned on the same side of the vibrational member of a sound generator with respect to an emission opening, for measuring a property measurable on that same side, or on the opposite side of such a member, for measuring a property measurable on that opposite side.

The measuring means may also be arranged on the vibrational member of a sound generator, so as to allow a measurement based on a movement of that member.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
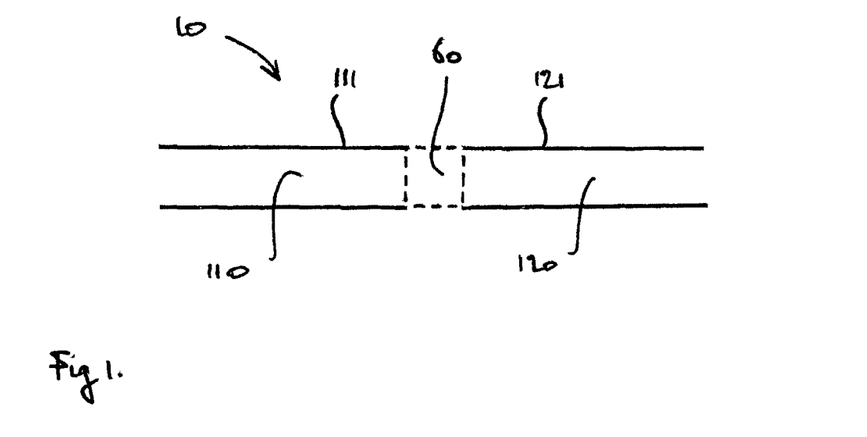
FIG. 1 shows a schematic side view of a device according to the invention, the figure especially showing a housing of such a device.

With reference to FIG. 1, a device according to the invention comprises a housing 10. The housing 10 comprises a first portion 110 and a second portion 120, wherein the two portions 110, 120 are spaced apart along a longitudinal axis of the housing 10 so as for a sound emission area 60 to be formed as an intermediate area in between the first portion 110 and the second portion 120.

The housing 10 comprises a pair of cylindrical outer surfaces 111, 112 formed as the outer surfaces of the first portion 110 and the second portion 120. By the outer surfaces 111, 121 being cylindrical, the surfaces 111, 121 are meant each to have a continuous circumference lying in a plane perpendicular to the longitudinal axis of the housing 10. Within the scope of the invention, the shape of the circumference may be round, polygonal, for instance hexagonal, or any other shape. Preferably, the shape is rotationally symmetric about the longitudinal axis.

It is noted, that although FIG. 1 shows the outer surfaces 111, 121 to have an elongated shape so as to have a size along the longitudinal axis that is much larger than the diameter as measured within a plane perpendicular to that axis, the surfaces 111, 121 may also be much shorter. In fact, depending on the embodiment, the length need not necessarily be larger than the diameter. Also the length of the housing 10 as a whole may be small as compared to an average diameter of an outer surface 111, 121 of a housing portion. Then, the size of the housing 10 along the axis indicated herein as the longitudinal axis need not be larger than that diameter.

According to an important embodiment of the invention, the two housing portions 110, 120 are each formed as a tube portion, so as for each housing portion 110, 120 to have an interior space 112, 122, as will later be described in reference to FIGS. 3a-3c. The housing portions 110, 120 will therefore in the following also be referred to as tube portions 110, 120. It should be noted, however, that in a specific embodiment wherein an interior space 112, 122 of a housing portion 110, 120 is not necessary for the functioning of the device, as will be made clear in the following, such a housing portion 110, 120 may for instance also be a solid rod.

With reference to FIGS. 2a-2d, the housing 10 comprises at least one emission opening 20, 30 for emitting a sound wave, provided within the sound emission area 60. Depending on the configuration of that opening 20, 30, the housing 10 may take different shapes within the sound emission area 60.

Figure 2A:
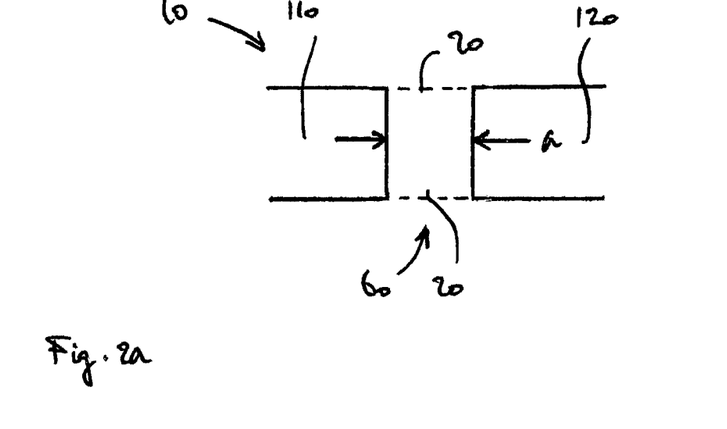
FIGS. 2a-2d each show schematic side views of part of the housing of FIG. 1 for various embodiments of the invention.

The housing 10 may lack a wall portion within the sound emission area 60, so as for the two housing portions 110, 120 to be separate from each other, and to be held with their outer surfaces 111, 121 in line with respect to each other along the longitudinal axis by a structure not shown in the figures. As indicated in FIG. 2a, in that case, a ring-shaped continuous opening 20 is present in between the facing ends of the two housing portions 110, 120, the continuous opening 20 extending along the continuous circumference of the housing 10 as defined within a plane perpendicular to the longitudinal axis.

Figure 2B:
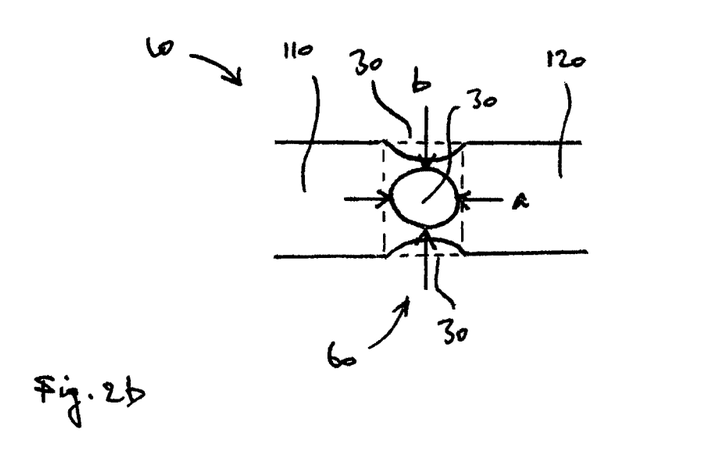
Figure 2C:
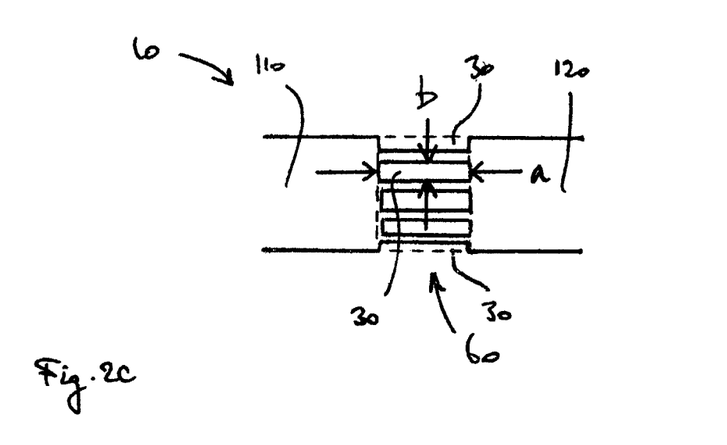

The housing 10 may also be substantially tube-shaped within the intermediate area 60, wherein the first housing portion 110 and the second housing portion 120 may further form an integral part. In either of these cases, according to the invention, a series of discrete openings 30 can be provided in the housing part within the sound emission area 60, the series of discrete openings 30 being ring-like arranged so as to extend along substantially the full circumference of the housing 10. With reference to FIG. 2b, the discrete openings 30 may be round. With reference to FIG. 2c, the discrete openings 30 may also have a slit-shape, extending in the longitudinal direction of the housing 10. Within the scope of the invention, also other shapes are possible.

According to the invention, a fraction of the circumference of the housing 10 covered by emission openings 30 may be limited to only 30 percent, the housing 10 thus being closed within the sound emission area 60 along up to 70 percent of the circumference, with sound of sufficient level still being able to be emitted along substantially the whole of the circumference. The openings 30 are preferably of mutually the same size and shape, and are preferably homogeneously distributed along the circumference of the housing 10.

Figure 2D:
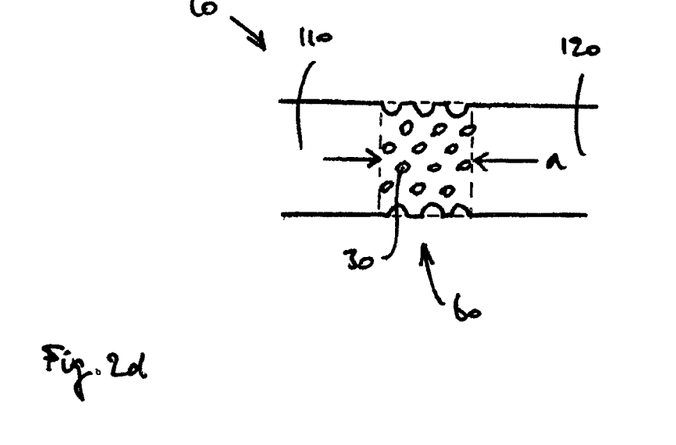

With reference to FIG. 2d, according to the invention, also a ring-like arranged grid of discrete openings 30 of any shape can be provided, wherein multiple openings 30 are arranged along the longitudinal axis of the housing 10 as well as along the circumference. Preferably, the openings 30 form an open area of at least 30 percent of the total grid area.

Figure 3A:
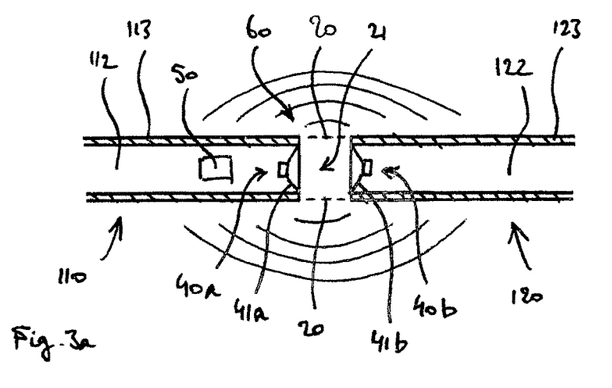
FIGS. 3a-3c show schematic longitudinal cross sectional views through the housing of FIG. 1, indicating various configurations of sound generators for different embodiments of the invention.
Figure 3B:
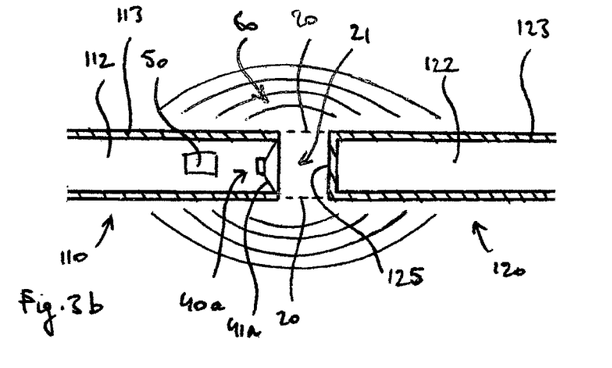
Figure 3C:
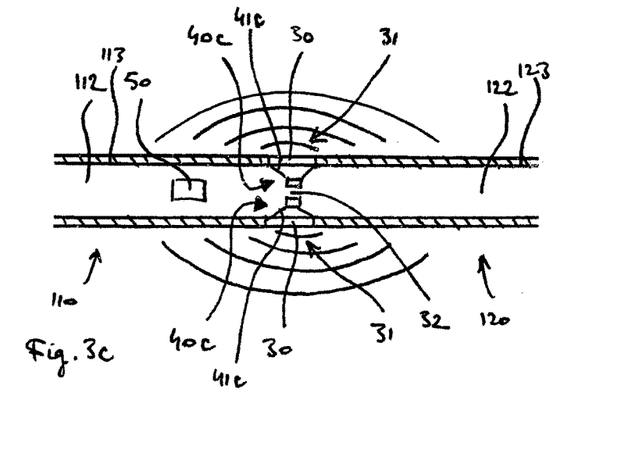

With reference to FIGS. 3a-3c, a device according to the invention comprises at least one sound generator 40a, 40b, 40c for generating a sound wave, wherein also depending on the configuration of the emission opening 20, 30, the position and orientation of the sound generator 40a, 40b, 40c varies for different embodiments of the invention. Also with reference to FIGS. 3a-3c, and as noted earlier, at least one of the housing portions 110, 120 may be formed as a tube portion so as to have an interior space 112, 122 surrounded by a wall 113, 123, the outer surface 111, 121 of the respective portion 110, 120 being formed as an outer surface of said wall 113, 123.

With reference to FIGS. 3a-3b, especially in the case of a continuous ring-shaped emission opening 20, a first sound generator 40a may be positioned with its vibrational member 41a lining the cross sectional opening of a first housing portion 110 formed as a tube portion. The sound generator 40a is thus configured for letting its vibrational member 41a move in the longitudinal direction of the housing portion 110, so as to generate an oscillating pressure difference, as compared to ambient pressure, within a cylindrical space 21 present in between the facing ends of the two housing portions 110, 120, the outer boundary of which is defined by the ring-shaped continuous opening 20.

As indicated in FIG. 3a, the first sound generator 40a may be faced by a second sound generator 40b similarly arranged in a second housing portion 120 formed as a tube portion, so as for the pair of sound generators 40a, 40b to be able to generate a combined oscillating pressure difference within the cylindrical space 21 by means of their oscillating vibrational members 41a, 41b facing said space 21.

As indicated in FIG. 3b, alternatively, the first sound generator 40a may also be faced by a reflecting surface 125 provided on the other housing portion 120 at the end facing the cylindrical space 21. In such a configuration, an oscillating pressure difference within the cylindrical space 21 is created comprising a first component resulting from a pressure wave coming from the vibrational member 41a of the first sound generator 40a, and a second component resulting from a reflection of said pressure wave coming from the reflecting surface 125. It is noted that in such a case, the housing portion provided with the reflecting surface need not necessarily be formed as a tube portion, but merely to be provided with a surface lining a cross section of the housing perpendicular to the longitudinal axis. Preferably, however, a reflecting surface 125 is formed on an end wall of a housing portion 120 formed as a tube portion, as indicated in the figure, the end wall closing off the interior space 122 of said housing portion 120.

With reference to FIG. 3c, especially in the case of a series of discrete emission openings 30, the series extending in the circumferential direction of the housing 10, multiple sound generators 40c may be arranged also in a series, the vibrational member 41c of each generator 40c being positioned lining one of the emission openings 30, the vibrational members 41c separating a space 32 connecting the interior spaces 112, 122 of two housing portions 110, 120 from the surroundings of the device. Thus, each generator 40c is configured for its vibrational member to generate an oscillating pressure difference directly outside an emission opening 30 of the housing 10, the multitude of generators 40c configured to generate such a pressure difference within a substantially ring-shaped space 31 directly surrounding the housing 10, along the full circumference thereof.

It is noted that in each of the described configurations of sound generators 40a, 40b, 40c, the respective vibrational members 41a, 41b, 41c separate a space 21, 31 in which an oscillating pressure difference is to be created from a space 32, 112, 122 formed inside the housing 10. By the vibrational members 41a, 41b, 41c being positioned such, they are allowed to vibrate such that by means of the generated oscillating pressure difference, at least for low frequencies, a sound wave of a relatively high level can be excited. By providing relatively long housing portions 110, 120, the attainable level can be increased.

With reference to FIGS. 3a-3c, a device according to the invention further comprises a measuring means in the form of a sensor 50 for measuring a property representative of the strength of a sound source generated by means of the device according to the invention. The sensor 50 is only depicted schematically, as many different embodiments of such a sensor 50 are conceivable. The sensor 50 is depicted to be arranged inside an interior space 112, 113 of a housing portion 110, 120, but may also be provided in an intermediate space 32 connecting such interior spaces 112, 113, or on the surface 111, 121 of a housing portion, depending on the embodiment. The sensor 50 may for instance be a pressure sensor for measuring a pressure difference generated in an interior space 32, 112, 113 as described. The sensor 50 may also be an accelerometer provided on a moving part of a sound generator 40a, 40b, 40c, such as a piston or a vibrational member 41a, 41b, 41c for displacing a certain volume of air, typically a membrane. The sensor 50 may also be any kind of sensor configured for measuring a displacement or velocity of air, such as a particle velocity sensor or a heat wire. For the sensor 50 to measure accurately, the sensor should be positioned relatively close to a sound generator 40a, 40b, 40c, in the case of a position within an interior 32, 112, 122 of the housing 10, or relatively close to an emission opening 20, 30, in case of a position on an exterior surface 111, 121 of the housing 10. The sensor 50 may also be combined with any other sensor useful for acoustics measurements, such as a pressure sensor or a thermometer. Naturally, a device according to the invention comprising the described sensor 50 and a possible additional sensor also comprises connecting means for connecting such sensors to a device for reading the output of the sensors.

Figure 4A:
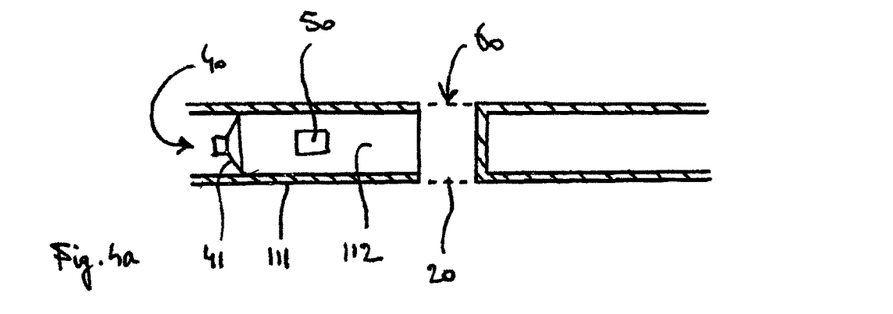
FIGS. 4a-4d show additional longitudinal cross sectional views indicating alternative positions of a sound generator and a measuring means with respect to each other.

With reference to FIG. 3a, a sound generator 40a having a vibrational member 41a lining the cross sectional opening of a tube portion 110 may be arranged directly adjacent the sound emission area 60. As indicated in FIG. 4a, such a sound generator 40 may also be provided however at a certain distance away from the sound emission area 60. Said certain distance may be for instance at least one time the average diameter of the outer surface 111, preferably multiple times.

With reference to FIG. 3a, a sensor 50 provided inside the housing 10 may be arranged on the opposite side of a vibrational member 41a of a sound generator 40a with respect to an emission opening 20. As indicated in FIG. 4a, such a sensor 50 may also be arranged however on the same side of a vibrational member 41 of a sound generator 40 with respect to an emission opening 20.

Figure 4B:
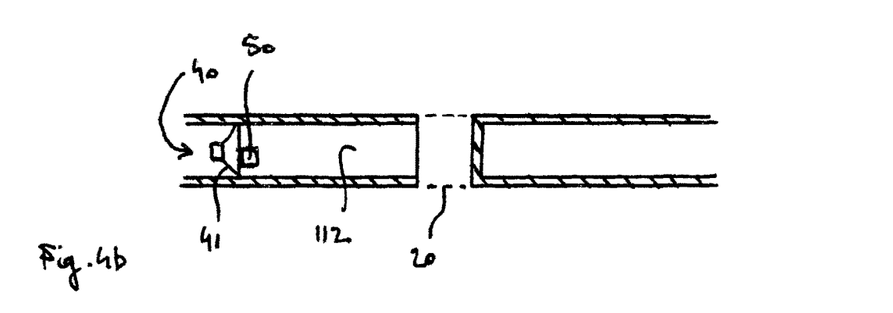
Figure 4C:
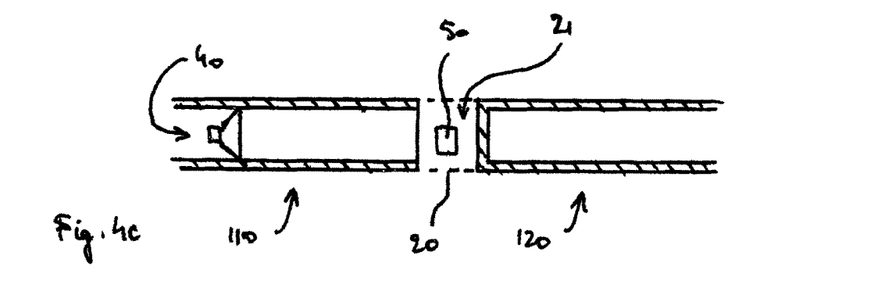
Figure 4D:
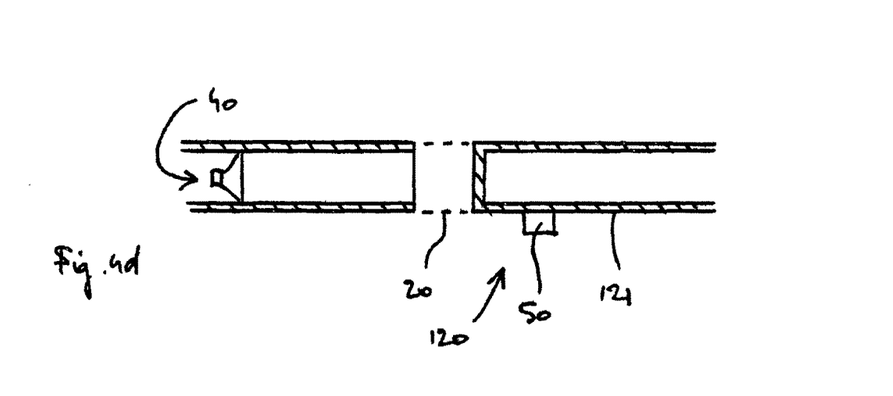

FIGS. 4b-4d respectively show schematic examples of a sensor 50 arranged on a moving part 41 of a sound generator 40, a sensor 50 provided inside a cylindrical space 21 formed in between two housing portions 110, 120, the sensor 50 thus being relatively close to an emission opening 20, and a sensor 50 provided on the outer surface 121 of a housing portion 120, which sensor 50 preferably is also positioned relatively close to the emission opening 20.

FIGS. 5a-5d show a whole of a housing 10 of a device according to the invention, suspended from a wire 300 passing through a center of the sound emission area 60 such as to be attached to the housing 10. With reference to these figures, a housing portion 110, 120 may have an end part 114, 124 located away from the sound emission area 60. A virtual border between a housing portion 110, 120 and an end part 114, 124 is indicated by a dashed line.

Figure 5A:
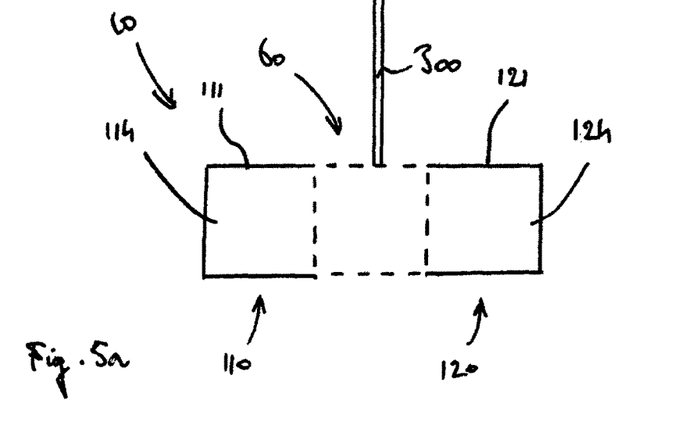
FIGS. 5a-5d show a whole of a housing of a device according to the invention for various embodiments.
Figure 5B:
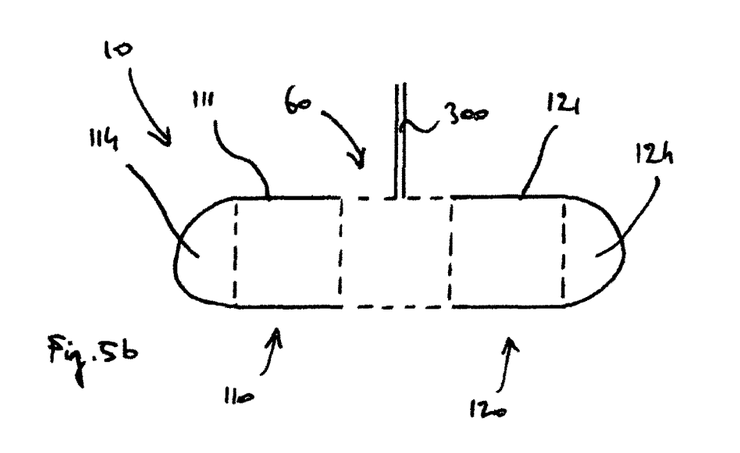
Figure 5C:
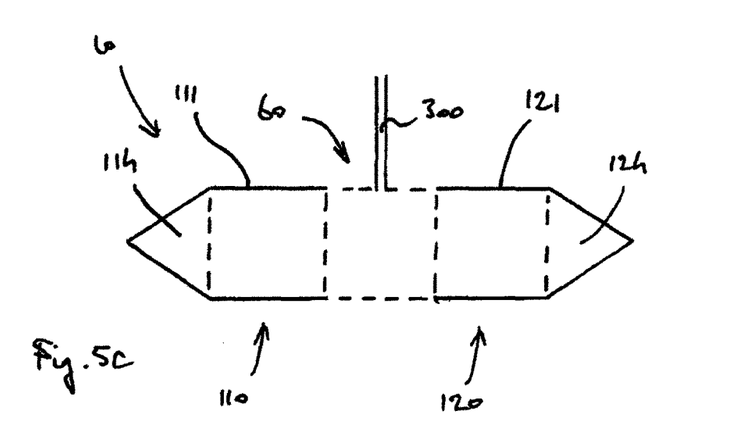

As shown in FIGS. 5a-5c, housing portions 110, 120 have cylindrical outer surfaces 111, 121 of constant diameter extending away from the sound emission area 60. At a certain distance away from the sound emission area, each cylindrical outer surface 111, 121 adjoins an exterior surface of such an end part 114, 124. With reference to FIG. 5a, the end part 114, 124 may comprise a straight wall, so as for the respective cylindrical outer surface to pass into a flat adjoining surface facing directly in the longitudinal direction of the housing 10. With reference to FIG. 5b, the end part 114, 124 may have a rounded shape, so as to form a dome. With reference to FIG. 5c, the end part may have a tapered shape, forming for instance a pointed cone as shown, or a blunt cone.

Figure 5D:
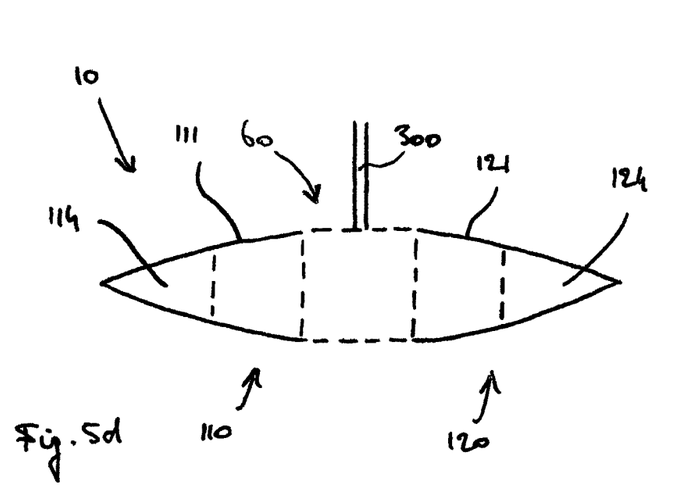

As shown in FIG. 5d, housing portions 110, 120 have cylindrical outer surfaces 111, 121 having themselves a tapered shape, so as for the diameter of an outer surface 111, 121 to gradually decrease for increasing distance away from the sound emission area 60. At the border with an end part 114, 124, the cylindrical outer surfaces 111, 121 each smoothly adjoin tapered exterior surfaces of those end parts, so as to form a cone shaped exterior of a housing portion 110, 120, tapering towards the longitudinal axis along the whole length of the housing portion 110, 120. It will be clear a cylindrical outer surface 111, 121 of a housing portion 110, 120 tapering towards the longitudinal axis may also be adjoined, at a certain distance away from the sound emission area, by the exterior surface of an end part comprising a straight wall 114, 124 as shown in FIG. 5a or a dome-shaped end part 114, 124 as shown in FIG. 5b, or the exterior surface of a blunt cone.

It will be clear that with a rounded shape and a tapered shape of an end part 114, 124 providing a more smooth transition for a propagating sound wave past an end of the housing 10, those shapes provide improved omnidirectionality. Preferably, a transition between a cylindrical outer surface 111, 121 and the exterior surface of an end part 114, 124 is smooth, as shown for the rounded shape and for the shape shown in FIG. 5d.

Rounded and tapered end parts 114, 124 may add to the size of the housing portions 110, 120 as compared to the lengths of the cylindrical outer surfaces 111, 121 described earlier. Depending on the embodiment, a length as described in respect of a cylindrical outer surface 111, 121 may however also comprise the size of an end part 114, 124 in the longitudinal direction of a housing 10.

Figure 6:
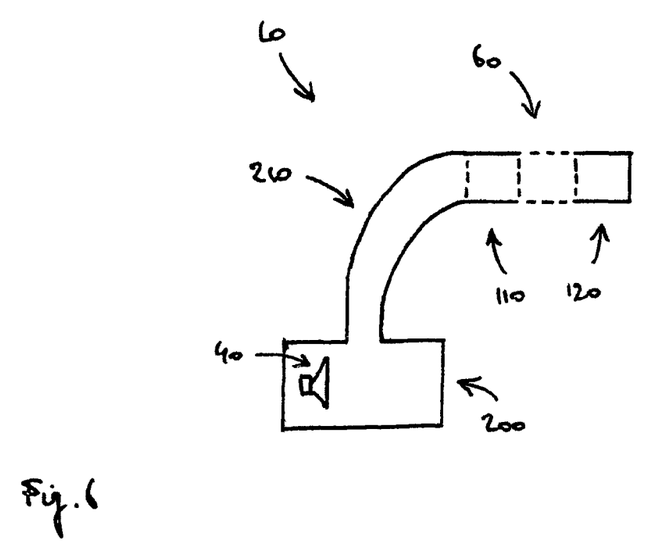
FIG. 6 shows a whole of a housing according to yet another embodiment.

Despite the possibility of embodiments with housing portions 110, 120 each having a free end away from the sound emission area 60, as shown in FIGS. 5a-5d, it is also possible for an end of a housing portion 110, 120 away from the sound emission area 60 to be attached to some structure, as indicated in FIG. 6. As shown, such a structure may comprise a channel 210 for passing a sound wave generated by a sound generator 40 positioned within a housing part 200 other than the housing portions 110, 120 as described towards a cross sectional opening of the attached housing portion 110 so as for it to be eventually emitted via the sound emission area 60. In such an embodiment, the presence of a sound generator 40 within either housing portion 110, 120 is not necessary. The housing 10 as a whole may then, as a result of the attached structure, have an asymmetrical shape.

With respect to the functioning of a device according to the inventions, it is noted that an oscillating pressure difference generated in the described cylindrical space 21 inside a housing 10 radiates as a pressure wave through the continuous emission opening 20, or through a series or grid of discrete openings 30 which may also be present in that case, towards the surroundings of the housing 10. From just outside the opening 20, or openings 30, the pressure wave, representative of a sound wave, is allowed to propagate outside the housing 10 as described in the introduction part of this application in the radial and axial directions of the housing 10. With respect to the propagation outside the housing 10, the same applies to an oscillating pressure difference created in a ring-shaped space 31 surrounding the housing.

It is noted that by selecting different sizes a, b for emission openings 20, 30 in the circumferential and longitudinal directions of the housing 10 as indicated in FIGS. 2a-2c, or by selecting an appropriate size a for a total length of a grid of openings 30 as indicated in FIG. 2d, the device can be optimized for obtaining a relatively high degree of omnidirectionality for certain frequencies of a sound wave ultimately generated by means of the generators 41a, 41b, 41c. A practical size is a size smaller than half the wavelength of a maximal frequency that a sound generator 41a, 41b, 41c is able to generate. It is noted that the size a as indicated in respect of a grid, or the size of the sound emission area 60 in the longitudinal direction of the housing for any type of embodiment, for that matter, is meant to be the maximal distance between the two longitudinally outermost edges of any emission opening or pair of emission openings, the two edges being located towards opposite ends of the device. A maximal width of part of the housing separating two emission openings, for instance a bar of a grid, preferably is less than a full wavelength.

Without limiting the scope of the invention, a typical diameter of a housing portion 110, 120 of a device used for frequencies of around 4 kHz is around 20 mm. For 2-3 kHz, a typical diameter is 80 mm. With these dimensions, it has been found possible to attain relatively loud sound levels at a maximal deviation of only a few dB as compared to ideal omnidirectionality providing a spherical wave front of an isotropic sound level.

It will be clear a device according to the invention basically comprises a sound generator for generating sound within an annular space defined around a central axis, the device comprising a pair of guiding surfaces for guiding sound away from the annular space in opposite directions along the central axis. It will be understood, in the earlier description, the central axis is represented by what is described as the longitudinal axis of the housing and the guiding surfaces are represented by the cylindrical outer surfaces of the described housing portions. With sound being guided as described, sound in addition being allowed to propagate outside the device in a radial direction with respect to the central axis, a high degree of omnidirectionality of the created sound source is attained.

It should be clear to a person skilled in the art that the present invention is not limited to the exemplary embodiments discussed above, but that several variations and modifications are possible within the protective scope of the invention as defined in the appending claims. Even if certain features are recited in different dependent claims, the present invention also relates to an embodiment comprising these features in common. Any reference signs in a claim should not be construed as limiting the scope of that claim.

Lastly, it is noted that the presence of a sensor 50 as described is not essential for obtaining a high degree of omnidirectionality. Therefore, applications may be conceivable in which a device as described, but lacking such a sensor 50, can be used to an advantage.

The invention claimed is:

1. A device for creating a three-dimensionality omnidirectional sound source comprising:
    an integrated sensor for measuring a property representative of the strength of the three-dimensionality omnidirectional sound source;
    a housing having a sound emission area comprising at least one emission opening for emitting a sound wave;
    at least one sound generator for generating a sound wave, arranged in the housing so as for a generated sound wave to radiate from the sound emission area; and
    connecting means for connecting the sensor to a device for reading the output of the sensor;
    wherein the housing has a longitudinal axis and a continuous circumference within a plane perpendicular to the longitudinal axis, the housing comprising a pair of housing portions located on opposite sides of the sound emission area, the housing portions each having a cylindrical outer surface extending away from the sound emission area along the longitudinal axis, the sound emission area extending along the continuous circumference;
    wherein the size of the sound emission area along the longitudinal axis is two times or less than the average outer diameter of one of the outer surfaces; and
    wherein at least one of the outer surfaces has the same cross-sectional shape along a length of one times or more of the average diameter.

2. The device according to claim 1, wherein each housing portion has a free end away from the sound emission area;

wherein end parts of the housing portions located away from the sound emission area are shaped to provide a transition for a propagating sound wave past the ends of the housing.

3. The device according to claim 1, wherein one housing portion has a free end away from the sound emission area;
wherein an end part of the housing portion located away from the sound emission area is shaped to provide a transition for a propagating sound wave past the end of the housing, the other housing portion being attached to a structure.

4. The device according to claim 3 further comprising a housing part, a sound generator being positioned within the housing part;
wherein the structure comprises a channel for passing a sound wave generated by the sound generator towards a cross sectional opening of the attached housing portion so as for it to be eventually emitted via the sound emission area.

5. The device according to claim 1, wherein the at least one emission opening comprises an opening selected from the group consisting of a ring-shaped continuous opening, a ring-like arranged series of discrete openings, and a grid of discrete openings, extending along the continuous circumference.

6. The device according to claim 1, wherein at least one of the housing portions is formed as a tube portion.

7. The device according to claim 1, wherein the two outer surfaces have symmetrical positions and shapes with respect to the sound emission area.

8. The device according to claim 2, wherein the end part of at least one of the housing portions has a tapered or rounded shape, and a transition between the at least one of the housing portions.

9. The device according to claim 1, wherein at least one of the outer surfaces has a rotationally symmetric shape.

10. The device according to claim 1, wherein the device comprises multiple sound generators each having a vibrational member lining one of multiple emission openings, the multiple emission openings being distributed along the circumference of the sound emission area.

11. The device according to claim 1 further comprising a sound generator having a vibrational member lining the cross sectional opening of a housing portion formed as a tube portion.

12. The device according to claim 11, wherein the sound generator is positioned with its vibrational member located directly adjacent the sound emission area.

13. The device according to claim 11, wherein the sound generator is positioned with its vibrational member located at a certain distance away from the sound emission area.

14. The device according to claim 11 further comprising a second sound generator arranged in the other housing portion.

15. The device according to claim 11, wherein the other housing portion is provided with a reflecting surface for reflecting a sound wave generated by the sound generator.

16. The device according to claim 1, wherein the sensor is arranged in the interior or on the exterior of the housing.

17. The device according to claim 1, wherein the sensor is positioned with respect to an emission opening on the same side of a vibrational member of a sound generator.

18. The device according to claim 1, wherein the sensor is positioned with respect to an emission opening on the opposite side of a vibrational member of a sound generator.

19. The device according to claim 1, wherein the sensor is arranged on a vibrational member of a sound generator.

20. The device according to claim 1, wherein at least one of the housing portions is connected to a structure comprising a channel for passing a sound wave generated by a sound generator positioned within a housing part other than the pair of housing portions towards the sound emission area through the at least one housing portion.

21. The device according to claim 1, wherein the diameter of a housing portion is selected from the group consisting of around 20 mm, 60 mm, and 80 mm.

22. The device according to claim 1, wherein the device is configured so the created three-dimensionality omnidirectional sound source emits sound of a certain level across the whole three-dimensional space surrounding the device.

23. A device for creating a three-dimensionality omnidirectional sound source comprising:
an integrated sensor for measuring a property representative of the strength of the three-dimensionality omnidirectional sound source;
a housing having a sound emission area comprising at least one emission opening for emitting a sound wave;
at least one sound generator for generating a sound wave, arranged in the housing so as for a generated sound wave to radiate from the sound emission area; and
connecting means for connecting the sensor to a device for reading the output of the sensor;
wherein the housing has a longitudinal axis and a continuous circumference within a plane perpendicular to the longitudinal axis, the housing comprising a pair of housing portions located on opposite sides of the sound emission area, the housing portions each having a cylindrical outer surface extending away from the sound emission area along the longitudinal axis, the sound emission area extending along the continuous circumference;
wherein the size of the sound emission area along the longitudinal axis is two times or less than the average outer diameter of one of the outer surfaces;
wherein at least one of the outer surfaces has the same cross-sectional shape along a length of one times or more of the average diameter; and
wherein at least one of the outer surfaces tapers towards the longitudinal axis for an increasing distance away from the sound emission area.

24. A measuring system for analyzing the acoustics of an environment comprising:
a loudspeaker positioned at a central location for emitting sound of a certain level, wherein the loudspeaker is provided with a sensor for measuring a property representative of a sound source created by the loudspeaker; and
a microphone for receiving the sound;
wherein the loudspeaker comprises the device according to claim 1.

25. A method for analyzing the acoustics of an environment comprising:
positioning a loudspeaker at a central location;
letting the loudspeaker emit sound;
measuring a property representative of the strength of the sound source created by the loudspeaker; and
letting a microphone receive the sound;
wherein positioning the loudspeaker at the central location comprises positioning the device according to claim 2 so as for the end part of each housing portion having a free end away from the sound emission area to provide a transition for a propagating sound wave past the end of the housing.

\* \* \* \* \*